May 3, 1938. R. E. DAVIS 2,116,343
SHEARS SHARPENING DEVICE
Filed March 16, 1937 2 Sheets-Sheet 1
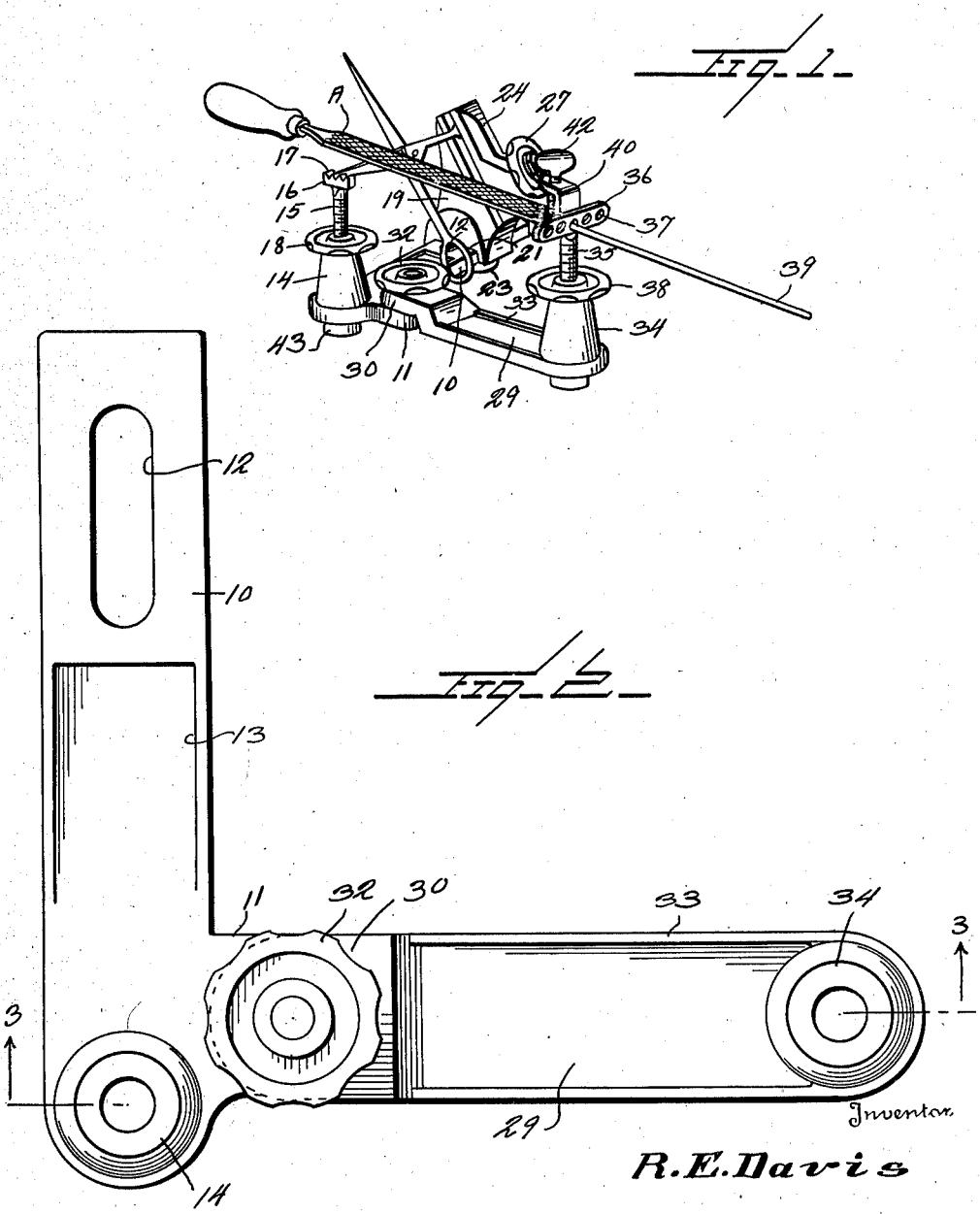
Inventor
R. E. Davis
By Watson E. Coleman
Attorney

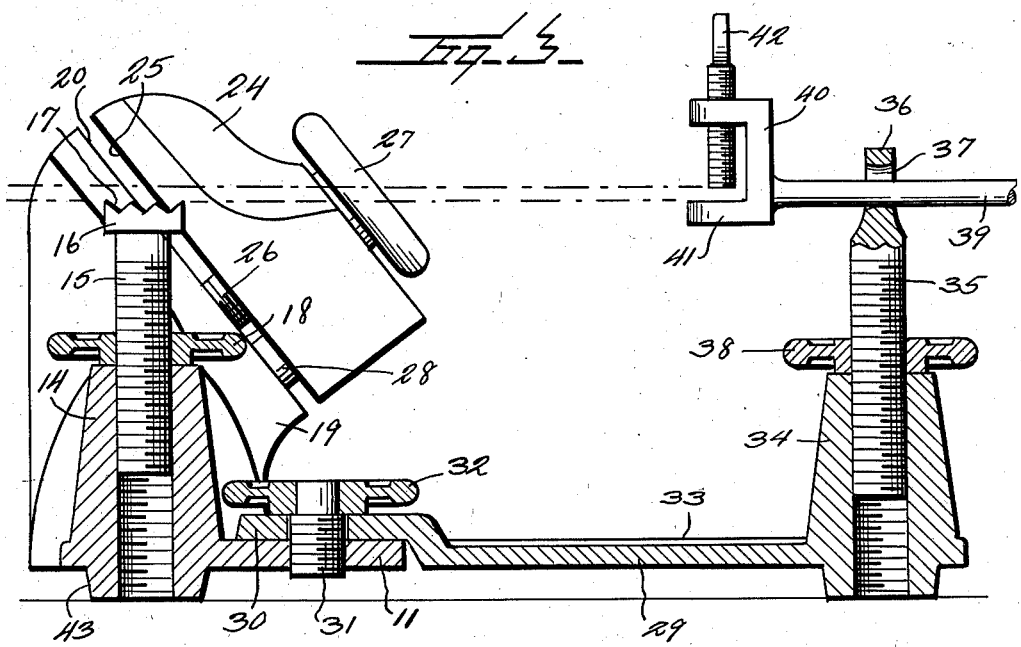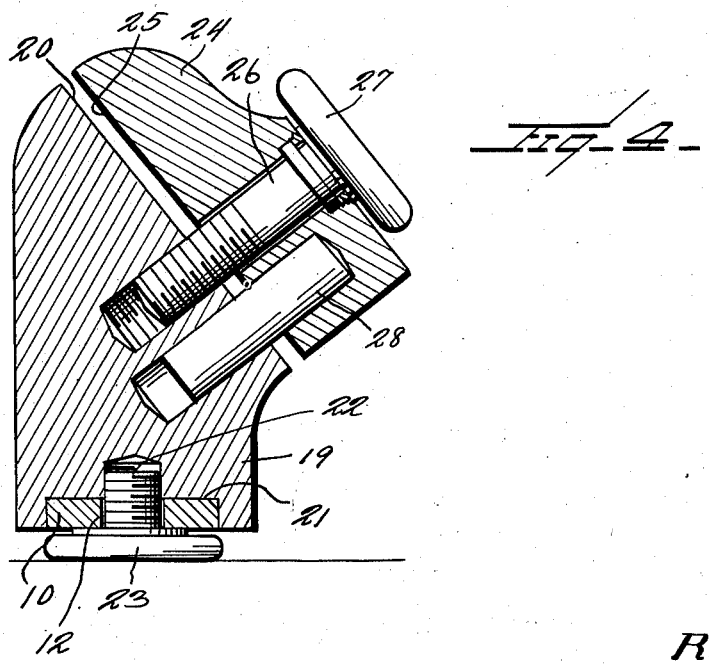

Patented May 3, 1938

2,116,343

UNITED STATES PATENT OFFICE 2,116,343

SHEARS SHARPENING DEVICE

Roy E. Davis, Boulder, Colo., assignor of one-half to Harry G. Davis, Boulder, Colo.

Application March 16, 1937, Serial No. 131,227

4 Claims. (Cl. 76—82.2)

This invention relates to sharpening devices and is designed primarily for the sharpening of shears but adapted to be employed for sharpening other articles and in any connection for which it is applicable.

In the usual shear sharpening devices known to me, the shear blade is clamped in such a manner that it is necessary after beveling and sharpening the shear blades, to employ a hammer to place them in the proper level and curvature as they are oftentimes sprung in the sharpening operation by the old-time clamp methods, and to overcome the foregoing objection is one of the aims of my invention.

A further object is to provide a sharpening device which includes means whereby a file or hone may be guided across the beveled edge of the blade at a selected angle to the length of the blade to thus produce a keener and more lasting cutting edge, and in this connection to provide a base having means for supporting the shear blade against bending movement and to provide an arm pivoted to the base and having a file support and guide, the arm being adjustable into any desired angular relation to the base and, therefore, to the shear blade, to thus secure the desired angular adjustment of the file or hone with relation to the length of the blade.

A further object is to provide a sharpening device which includes means for clamping the eye or handle end of a shear blade with the blade at an angle to a vertical plane, to provide a vertically adjustable shear blade supporting element having an angular seat for the point of the shear blade and provide a vertically adjustable file or hone support having an angularly adjustable guide for the file or hone.

A still further object is to provide a shear sharpening device constituting a permanent and substantial means for sharpening shears having means for positioning the shear blade to secure any desired bevel, means for clamping and holding the shear blade to prevent its accidental shifting or altering during the sharpening or finishing operations, and thus avoid the chance of springing the points of the shear blade and to provide a shear sharpening device which is comparatively simple in construction and arrangement of its parts, which is strong, durable, compact, thoroughly efficient in use, which is conveniently adjustable, readily assembled and comparatively inexpensive to manufacture.

My invention is illustrated in the accompanying drawings wherein:

Figure 1 is a perspective view of my improved shear sharpener.

Figure 2 is a top plan view of the base and arm, the shear clamp being removed.

Figure 3 is a section on the line 3—3 of Figure 2.

Figure 4 is a vertical section through the shear clamping members.

Referring to these drawings, 10 designates a base having at one end the angularly extending lug or extension 11. This base is longitudinally slotted at 12 and is formed with a longitudinally extending depressed portion 13, though this last is not an essential feature of my invention. Mounted upon one end of the base remote from the slot 12 is an upstanding post 14 which may be made integral with the base, this post having an interiorly threaded bore. Engaging in this bore is a screw 15, the upper end of which is formed with a T-shaped head 16 having its upper face formed with a plurality of V-shaped or angular notches 17. The screw threads on the screw 15 and post 14 are of slight pitch so that a fine vertical adjustment may be secured for the screw 15 as it is turned in one direction or the other. For the purpose of holding this screw 15 in any vertically adjusted position or in any rotated position, I provide a nut 18 in the form of a wheel which is, of course, screw threaded on the screw 15 and which has an undersurface bearing against the upper end face of the post 14. This upper end face of the post and preferably the underface of the nut 18 are ground. This nut 18 acts as a binding nut holding the screw 15 in any adjusted position.

Slidingly mounted upon the outer end of the base 10 over the slot 12 is the lower clamping element 19. The upper face of this element is downwardly and laterally beveled, as at 20. The lower face of the element is recessed at 21 to receive and fit over the base 10. The underface of the element 19 and the contacting faces of the base are preferably ground so as to secure a smooth sliding fit. Extending through the slot 12 is a binding screw 22 having a relatively large head 23. This head 23 not only acts as a head for the screw but also as a foot supporting this end of the base and the lower clamping element.

Coacting with the lower clamping element 19 is an upper clamping element 24 having a face 25 which confronts the face 20. These faces 20 and 25 extend downward and away from the base at any desired angle as, for instance, an angle of 45°. Passing through this upper clamping element 25 and into the lower clamping element 19 is a steel screw 26 having a clamping head 27.

In order to hold the clamping jaws 19 and 24 from any pivotal movement upon this screw, I provide the steel dowel pin 28, which is carried by either one of said jaws or elements 19 or 24 and extends into the other jaw or clamping element so as to slide therein. By the means which I have described, it is possible to force the clamping jaws toward or from each other and hold them in their clamped position so that the eye or handle end of a shear blade may be clamped between these jaws with the shear blade held at an angle of approximately 45°. The shear blade may be disposed close to the screw 26 or may be disposed at the outer or upper end of the jaws 24 and 19 so as to accommodate shears of greater or shorter length.

Pivoted upon the lug 11 is an arm 29. This arm at its end adjacent the lug is upwardly deflected or offset, as at 30, this offset portion lying over the extremity of the lug 11. It is rotatably mounted upon this lug by means of the threaded pin 31, the upper end of which carries the head 32. By screwing down this screw 31, the arm 29 may be held in any rotatably adjusted position with relation to the lug 11 and with relation therefore to the base 10. Any other means for pivoting the arm upon the lug 11 and for holding the arm in an adjusted position is within the purview of my invention. The upper face of the arm 29 has slight marginal flanges 33 and at the free end of the arm there is mounted a post 34 having an interiorly screw threaded bore. Operating within this bore is a screw 35 which at its upper end carries a T-head 36 formed with a plurality of apertures 37. A lock nut 38 has threaded engagement with the screw 35 and the underface of this nut is ground so as to have clamping engagement against the upper end of the post 34 when the nut is turned downward. By this means the screw 35 may be held in any vertically adjustable position or any rotatably adjusted position. Coacting with the guide apertures in the T-shaped head 36 is a file guide 39 in the form of a rod sliding freely through any one of the apertures 37. This rod carries at its inner end the clamp 40, the lower end of which is formed with a jaw 41 and the upper end with a screw 42. This clamp screw will hold a file A between the lower jaw 41 and the clamp screw so that the file is in line with the guide rod 39.

The underface of the base 10 below the post 14 is provided with a foot 43. As before explained, the head 23 of the screw 22 constitutes a foot for the base immediately beneath the shear clamping jaws, and a third foot is provided beneath the post 34.

It will be seen that with this construction, the eye or handle end of a shear blade may be gripped between the jaws 19 and 24, and that the blade will then be held at a certain angle to a horizontal plane with the point of the shears resting in any one of the notches 17. The rest or head 36 may be elevated so as to bring the file or other abrading instrument at any desired angle with relation to the edge of the shears so as to secure the desired bevel for the shear blade. By shifting the arm 29 in one direction or the other, the direction of the cut made by the file may have any desired angular relation to the length of the shear blade. Obviously the pair of jaws 19 and 24 may be shifted toward or from the post 14 so as to accommodate shorter or longer blades and the blade rests 15—16—17 may be raised or lowered to accommodate the length of the shear blade or the rest rotated into proper relation to the length of the shear blade. By providing a plurality of apertures 37, the guide rod 39 may be inserted in any one of these apertures to thus permit the file to traverse any desired portion of the blade without twisting the rod 39. By clamping the handle or eye end of the blade and supporting the point on the rest 16, the curvature or set of the blade will not be taken out during the sharpening process. The movable arm 29 gives a very wide range of angular adjustment and this causes the file to give the shear blade a keener and longer-lasting cutting edge.

While I have illustrated certain details of construction and arrangement of parts, I do not wish to be limited to this as various minor changes might be made without departing from the spirit of the invention as defined in the appended claims.

It is also to be understood that while this device is particularly designed for use in sharpening shear blades, yet it may be also used for any purpose for which it is found applicable.

What is claimed is:—

1. A shear sharpening device, including a base having a handle clamp at one end and a blade rest at the other, an arm pivoted to the base for swinging movement in the plane of the base, means for clamping the arm in any adjusted position with relation to the base, and a file supporting and guiding means carried by the end of the arm.

2. A shear sharpening device, including a base having a handle clamp at one end and a blade rest at the other, an arm pivoted to the base for swinging movement in the plane of the base, means for clamping the arm in any adjusted position with relation to the base, a file supporting and guiding means carried by the end of the arm and including a post, a screw extending vertically into said post, and a binding nut for locking the screw in any adjusted position, the upper end of the screw having a head provided with a plurality of openings disposed in a plane parallel to the plane of the base for the file supporting and guiding means.

3. A shear sharpening device, including a base having a shear handle clamp at one end and a blade rest at the other, the clamp being adjustable along the base toward or from the blade rest, the clamp comprising two clamping elements having their confronting faces disposed at an angle to a horizontal plane, means for locking the clamp in any adjusted position along the base, an arm pivoted to the base for swinging movement in the plane of the base, means for clamping the arm in any adjusted position, a post carried upon the end of the arm, a screw vertically adjustable in the post and having an aperture at its upper end, means for binding the screw in any vertically adjusted position, and a file supporting and guiding means comprising a rod reciprocatable through the last named aperture and having a clamp for engaging the forward end of a file.

4. A shear sharpening device, including a base having a post at one end and an angularly disposed lug at this end, a vertically adjustable screw engaging said post and having a head at its upper end provided with a plurality of notches for the reception of the point of a shear blade, the opposite end of the base being longitudinally slotted, a shear clamp comprising a lower clamping element and an upper clamping element, the lower clamping element having sliding engagement with the base, a headed screw passing through the slot in the base and into said lower clamping element whereby to hold it in adjusted position, the lower clamping element having a downwardly and laterally inclined face, an upper clamping element having confronting face, a screw for forcing the clamping elements towards each other, an arm pivoted upon the lug for swinging movement toward or from the plane of the base, the outer end of the arm having an interiorly screw threaded post, a screw engaging said post and vertically adjustable therein, the screw at its upper end having a transversely extending head provided with a plurality of apertures, a binding nut engaging the screw in the upper end of the post and holding the screw in adjusted positions, and a file guide comprising a rod reciprocatable through any one of said apertures and having a clamp at one end to engage the extremity of a file.

ROY E. DAVIS.